Sept. 10, 1935. L. O. WIESE 2,013,818
METHOD OF SHARPENING AND REPOINTING PLOWSHARES
Filed Jan. 27, 1934
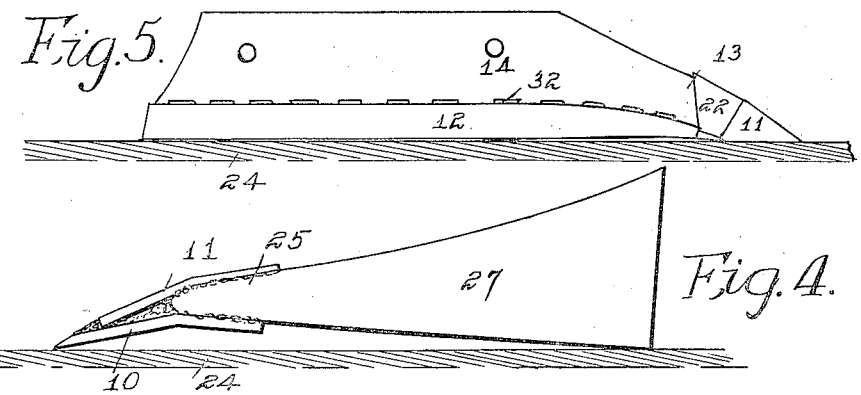
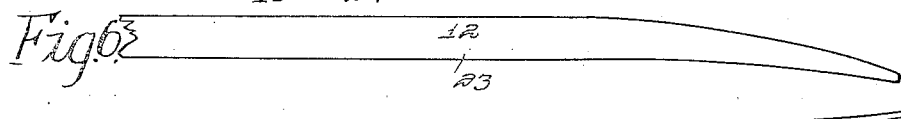
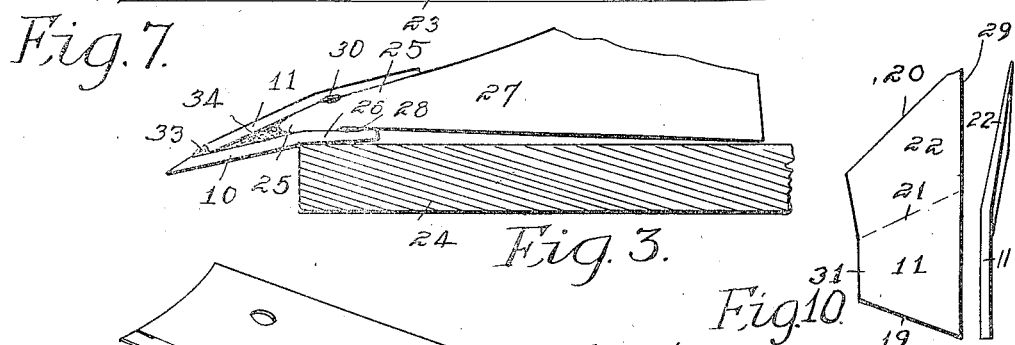
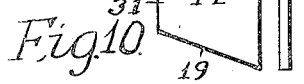
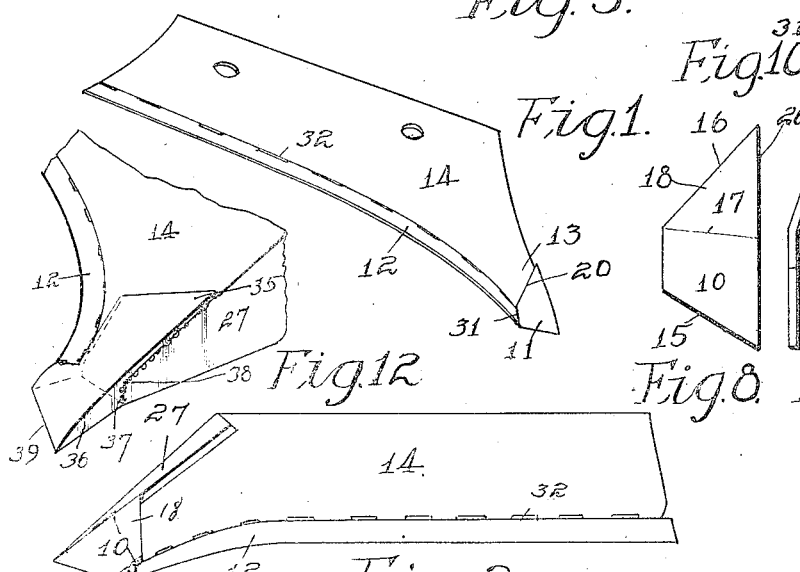
Inventor
Lee O. Wiese
by Orwig & Hague Attys Patented Sept. 10, 1935

2,013,818

UNITED STATES PATENT OFFICE 2,013,818

METHOD OF SHARPENING AND REPOINTING PLOWSHARES

Lee O. Wiese, Perry, Iowa

Application January 27, 1934, Serial No. 708,686

11 Claims. (Cl. 29—14)

This invention relates to resharpening and repointing of badly worn plow shares.

Heretofore in order to repair worn plow shares it has been necessary to take them to a person who has had years of experience in the art of sharpening and repointing and tempering plow shares. The majority of this repair work has been done by experienced blacksmiths, due to the fact that it is usually very difficult to properly weld the new repair elements to the plow share. This welding operation draws the temper from the plow share, said share having to be retempered after the welding and finishing has been completed. For various reasons the number of experienced blacksmiths has diminished each year until at the present time but comparatively few workers remain who are capable of properly and efficiently sharpening and repairing worn plow shares, thus making it very difficult for the agriculturist to have this work done.

The old method of welding is being rapidly replaced by more modern methods, such as electric arc welding, acetylene welding, and so forth. Almost every machine shop or automobile repair shop is provided with modern welding outfits and a large number of men are capable of accomplishing a comparatively simple welding operation.

It is, therefore, the object of this invention to provide an improved method and means for carrying out the method, whereby a comparatively inexperienced operator, having some knowledge of electric welding, may easily and quickly sharpen and repoint plow shares in a cheap and satisfactory manner.

A further object is to provide an improved method of sharpening and repointing plow shares whereby an auxiliary strip of steel may be welded to the share to replace that portion worn away by use, and without drawing the temper from the main body portion, and at the same time maintain the desired thickness and strength at the point where the greatest strength is needed.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a perspective view of a plow share sharpened and repointed by my improved method.

Figure 2 is a bottom view of the plow share showing the manner in which the lower pointing element is secured to the cutting element, and to the landside portion of the share.

Figure 3 is a side elevation of the landside end of the plow share showing the manner in which the plow share is carried by a suitable support to permit easy assembling and alinement of the repointing elements.

Figure 4 shows the said plow share and points in position for receiving the cutting element.

Figure 5 is a front view of the plow share and the cutting element applied thereto.

Figure 6 is a top view of the cutting element before being applied.

Figure 7 is a front view of Figure 6.

Figure 8 is a top view of the lower pointing element.

Figure 9 is an end elevation of the same.

Figure 10 is a top view of the top pointing element.

Figure 11 is an end elevation of same.

Figure 12 is a perspective of a modified form of pointing element.

In carrying out my improved method, I first provide three repair elements, which I shall term the lower pointing element indicated by the numeral 10, the upper pointing element indicated by the numeral 11, and the cutting element indicated by the numeral 12.

The lower pointing element 10 is formed from a flat and comparatively thin piece of bar steel of a width substantially equal to the width of the point 13 of the plow share 14. Said bar is about 1/8" thick and has its forward end beveled at 15. The rear end of the member 10 is beveled at 16 in the opposite direction from the bevel 15. The rear end portion of the member 10 is bent downwardly along a line 17. That portion back of the line 17 is somewhat tapered toward its rear end. The rearwardly extending portion is designated by the numeral 18.

The upper pointing member 11 is also formed of a thin bar of steel and of a width substantially equal to the width of the member 10, having its forward end also provided with a beveled portion 19 and its rear end with a beveled portion 20. The main body is bent along the line 21 to form a rear portion 22. The said rear portion is beveled toward the rear end, somewhat widened as clearly illustrated in Figures 10 and 11. The rear portion 22 is also tapered toward its rear end.

The cutting element 12 is also formed of bar steel having its front edge beveled at 23. The cutting element 12 is tapered toward its forward end, having its back edge curved to fit the forward edge of the plow share 14. The forward end of the member 12 is also bent upwardly, as shown in Figure 7, to make the cutting element fit the share.

In the application of these elements to the plow share the operator first lays the cutting element 12 in the position it would assume above a worn cutting edge of the share. A line is then drawn on the plow share back of the cutting element so that the operator may grind the forward edge of the plow share to fit the back edge of the cutting element.

After this has been done, the operator then places the member 10 on top of a suitable support or table 24, with the forward end of the member 10 extending beyond one edge of the table, in the manner clearly illustrated in Figure 3, with the rear portion 18 resting on the table top. The plow share is then placed in position with the worn nose 25 supported on top of the member 18, with the edge 26 of the member 18 in alinement with the land side portion 27 of the share. The nose 25 is extended substantially to the line 17. The edge 26 is then spot welded to the lower edge of the member 27 at the point 28.

By this arrangement it will be seen that the forward portion of the member 10 extends beyond the nose 25 a considerable distance.

The top pointing member 11 is then grasped and placed above the point 25 with the edge 29 adjacent to and in alinement with the upper edge of the member 27, with the edge 19 of the member resting on top of the forward end of the member 10. The portion 22 lies flat on top of the point 25, as illustrated in Figures 1, 2 and 3.

When the member 11 has been properly alined, then it is temporarily secured in position by spot welding at the point 30. The plow share is then moved rearwardly on the table top 24, as illustrated in Figure 4, with the forward edge of the member 10 resting on the table top.

The cutting element 12 is then placed in position with its back edge adjacent to the previously prepared edge of the member 14, with its tapering end resting on the member 10 and adjacent to the edge 31 of the member 11. The cutting edge of the member 12 rests on the table top as illustrated in Figure 5.

By this arrangement it will be seen that the member 12 can be easily alined with the pointed members 10 and 11, and with the forward edge of the plow share 14.

The back edge of the member 12 may then be welded to the forward edge of the member 14 at spaced intervals 32. The pointed end of the share may then be welded to both of the members 10 and 11, so that the members 10, 11 and 12 are fixed together as a unit.

After these members have been properly alined, the adjoining ends of the members 10 and 11 are welded together at the point 33, and the edges 26 and 29 of the members 10 and 11 are then completely welded to the land side portion 27. The space 34 adjacent to these edges may also be filled with welding material.

By this arrangement the member 22 will overlap the top portion of the pointing element 25 without being permanently secured thereto. This permits the dirt to move over the top of the member 22 onto the plow share without difficulty. The upper surface of the members 11 and 12 and the welded portion may then be ground and finished.

When it is desired to remove the pointing elements 10 and 11, and the member 12, a cold chisel may be inserted between the edge 20 and the member 22 and the top surface of the share point 25, causing the welded seam joining the member 27 to be broken. The spots 32 may then be either cut loose with a chisel or an acetylene flame, so that the repair elements may be easily removed when so desired and replaced with a new set.

By this arrangement the cutting element and the repointing elements may be rigidly secured to the plow share without drawing the temper from the share to any great extent, and only at the points where the welding takes place, thus eliminating the necessity of having to retemper the plow share.

Referring to Figure 2 it will be seen that the member 10 ties the pointed end of the member 12 to the lower edge of the land side member 27 of the share. When the top is finished, the top surface of the cutting element 12 is even with the top surface of the member 14, so that a comparatively small amount of power is required to advance the share through the ground.

By this method it will be seen that any person knowing how to operate an electric welding outfit may be easily taught to repoint and sharpen plow shares, inasmuch as the elements 10, 11 and 12 are formed substantially in the proper shape in a factory equipped to make them, and delivered to the operator for use. In practice the member 12 may be made in various shapes to meet the curvatures of the different makes and sizes of plow shares.

I find in actual practice that about three shapes meet the requirements for practically all makes and sizes of plow shares.

By placing the elements in position in the order above named, it will be seen that they may be easily and quickly alined with the plow share. Heretofore this has been one of the most difficult features, inasmuch as the plow share had to be heated, as well as the pointing elements, at the time they were placed in position, and this work had to be done very rapidly in order to make a proper weld. Oxidation of the surface of the metal is also troublesome and required considerable grinding and refinishing after the welding had been done. Furthermore, the temper of the plow had to be accomplished after the pointing and sharpening had been done.

In Figure 12 I have illustrated a modified form of pointing element, comprising a comparatively thin plate 35 adapted to be placed over the worn nose of the plow share, having at its forward end an enlarged portion 36 to form a shoulder 37 designed to rest against the rounded and worn end 38 of the share nose. The forward end of the portion 36 is tapered to form a sharpened edge 39. The inner edge of the member 35 has a notch 40 for receiving the forward end of the cutting element 12. The adjoining edges of said elements are welded together as before described, the lower edge of the shoulder being welded to the lower edge of the worn edge 38, which the outer edge of the plate 35 is welded to the upper edge of the landside member 27.

I claim as my invention:

1. The method of sharpening and repointing the cutting edge of a plow share, which consists in first providing upper and lower point elements and an auxiliary cutting element, then grinding away a portion of the worn cutting edge of the plow share to be repaired to fit the back edge of the said cutting element, applying said elements to the plow share by first superimposing the worn share point on top of the lower pointing element with the forward edge of said share point back of the forward edge of said lower pointing element, then temporarily securing said members together by welding, then superimposing the upper pointing element on the top and front surfaces of the worn nose with the forward edge of the upper pointing element adjacent to the upper surface of the lower pointing element and back of the forward edge, then welding said elements together, then placing the auxiliary cutting element in position with the back edge of said auxiliary cutting element adjacent to the front edge and ground surface of said share with the forwardly extending end of said auxiliary cutting element adjacent to the adjacent ends of said upper and lower pointing elements, then welding all of said adjacent ends together, then welding the back edge of said auxiliary cutting element to the share body, and finally filling any desired cavities and recesses with welding material.

2. The method of sharpening and repointing a plow share, which consists in providing upper and lower pointing elements and a cutting element, temporarily welding the lower pointing element to the under surface of the worn plow share nose, temporarily welding the upper pointing element to the upper and forward face of the share point with the forward edge of the upper pointing element adjacent to the front portion of the lower pointing element, fitting and welding the cutting element to the worn cutting edge of the share with the front end of the cutting element adjoining the upper and lower pointing elements, welding the adjoining ends of all of said elements together, permanently welding the outer edges of the upper and lower pointing elements to the upper and lower edges of the land side portion of the share, and then filling recesses and cavities with welding material.

3. The method of sharpening and repointing a worn plow share which consists in providing upper and lower pointing elements and a cutting element, welding the upper and lower pointing elements to their respective sides of the share nose, fitting and welding the cutter element to the share with the front end of the cutting element adjacent to the adjoining ends of the pointing elements, welding all of the adjoining elements together, and welding only the outer edges of the pointing elements to their respective adjacent edges of the land side portion of the share with the back and inner edges of the upper pointing element overlapping the nose portion of the plow share.

4. The method of sharpening and repointing a worn plow share, which consists in providing upper and lower pointing elements and a cutting element, welding the upper and lower pointing elements to their respective sides of the share point, fitting and welding the cutter element to the share with the front end of the cutting element adjacent to the adjoining ends of the pointing elements, and welding all of the adjoining elements together.

5. The combination of a plow share having a worn nose and cutting edge, a lower pointing element secured to the under surface of the nose, an upper pointing element supported above the upper surface of the worn nose having its forward end adjoining the forward end of the lower element, a replacement cutting element adjoining the worn cutting edge of the plow share, one end of said replacement element terminating near the pointing elements, means for securing all three of said elements integrally together and for securing said elements to said plow share.

6. The combination of a plow share having a worn nose and cutting edge, and a land side portion having one end terminating in the pointed end, a lower pointing element beneath the lower edge of the pointed end of said land side portion and the lower edge of the nose of said share, the outer edge of said lower pointing member being permanently fixed to the lower edge of said land side portion, a pointing element placed above the worn nose of said plow having its forward end adjoining the upper surface of the forward end of the lower pointing element, said adjoining portions being permanently joined together, only the outer edge of said upper pointing element being permanently fixed to the upper edge of the pointed end of the land side portion, a replacement cutting element having its back edge secured to the worn cutting edge of said plow share with the said cutting element in a common plane with the body of said plow share, one end of said cutting element being permanently secured to both of the upper and lower pointing elements.

7. The combination of a plow share having a worn nose and lower pointing element secured to the under surface of the nose, an upper pointing element supported above the upper surface of the worn nose and extending forwardly thereof and adjoining the forward end of the upper surface of the lower element, and means for securing the forward end of the upper pointing element to the lower pointing element and for securing the land side edge of the upper pointing element to the upper edge of the land side portion of the share, with the opposite edge and the upper end of the pointing element unsecured to the plow share.

8. In a device of the class described, the combination of a worn plow share, a repointing element welded to a worn nose and extending beyond the forward end thereof, a comparatively narrow cutting member shaped to fit and welded to the worn cutting edge of said share, the forward end of said cutting member being tapered and having its inner edge adjoining and welded to an adjoining edge of said repointing element.

9. A repair element for plow shares comprising a body having a comparatively thin flange portion and an enlarged and tapered portion to form a pointed nose portion, the enlarged portion being adapted to abut the forward end of the worn end of the nose with said flange overlapping the top of said nose and the adjacent share body, the inner edge of said flange having a notch for receiving one end of a replacement cutting element whereby the cutting element and said pointed element may be welded into a unitary unit.

10. The method of sharpening and repointing a worn nose of a plow share which consists in first providing upper and lower repair elements, applying, aligning, and welding the lower repair element to the under surface of the nose portion with its front end extending beyond the worn end of the nose, then applying, aligning, and welding the upper repair element to the upper surface of the worn nose with its front end overlapping the lower end of the lower repair element and welding the adjoining ends of the elements together, and finally filling in any undesired cavity with welding material.

11. The method of sharpening and repointing worn plow shares which consists in dressing the worn cutting edge of the share, fitting and welding a repair element to the nose portion of the share, fitting a sharpened replacement element to the dressed edge of said share and its forward end to the inner edge of said repointing element, welding the adjoining portion of the pointing element and the plow share to the corresponding adjoining portions of said sharpened repair element.

LEE O. WIESE.